Feb. 14, 1956    D. F. GEBHART    2,734,326
TRACTOR MOUNTABLE SUPPORT FRAME AND CUTTING ASSEMBLY
Filed Sept. 28, 1953    3 Sheets-Sheet 1

Dave F. Gebhart
INVENTOR.

BY *Clarence A. O'Brien*
*and Harvey B. Jacobson*
Attorneys

Feb. 14, 1956 D. F. GEBHART 2,734,326
TRACTOR MOUNTABLE SUPPORT FRAME AND CUTTING ASSEMBLY
Filed Sept. 28, 1953 3 Sheets-Sheet 2

Dave F. Gebhart
INVENTOR.

Feb. 14, 1956  D. F. GEBHART  2,734,326
TRACTOR MOUNTABLE SUPPORT FRAME AND CUTTING ASSEMBLY
Filed Sept. 28, 1953  3 Sheets-Sheet 3

Dave F. Gebhart
INVENTOR.

BY
Attorneys

United States Patent Office 2,734,326
Patented Feb. 14, 1956

2,734,326

TRACTOR MOUNTABLE SUPPORT FRAME AND CUTTING ASSEMBLY

Dave F. Gebhart, Auburn, Calif.

Application September 28, 1953, Serial No. 382,616

5 Claims. (Cl. 56—25.4)

This invention relates to a cutter attachment for tractors, and more particularly to an attachment adapted to be detachably and adjustably supported on a tractor and disposed forwardly thereof and driven by the power take-off of the tractor.

An object of this invention is to provide a cutter attachment for tractors having a plurality of laterally disposed cutting blades which are longitudinally offset, whereby the cutting blades of one cutting member will substantially overlap the blades of the adjacent cutting member, whereby a full, clear path may be cut by the machine.

Another object of this invention is to provide a cutting attachment for tractors having a novel means for securing the attachment to the front end of a tractor.

A further object of this invention is to provide a cutting attachment for tractors which is vertically adjustable to vary the height of the cut desired.

A further object of this invention is to provide a cutting attachment for tractors having a novel drive means for driving the cutter blades.

A still further object of this invention is to provide a novel support for attaching implements to the forward end of a tractor.

Still another object of this invention is to provide a novel support whereby implements can be easily and quickly attached or detached from a tractor.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 5 is an enlarged sectional view taken substantially along the section line 5—5 of Figure 4.

Figure 3:
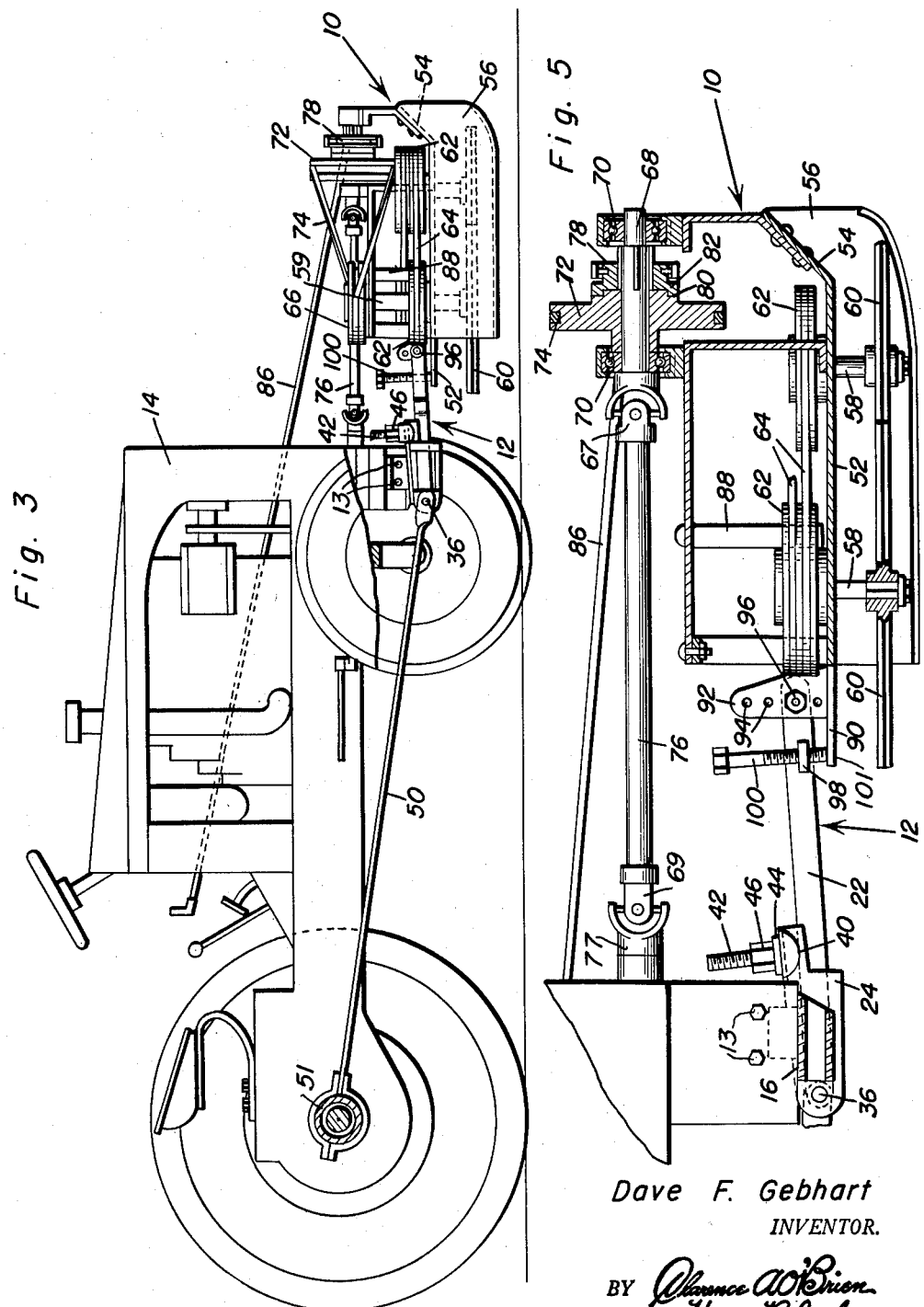
Figure 3 is a side elevational view, showing the cutting attachment and support mounted on a tractor.
Figures 4, 6:
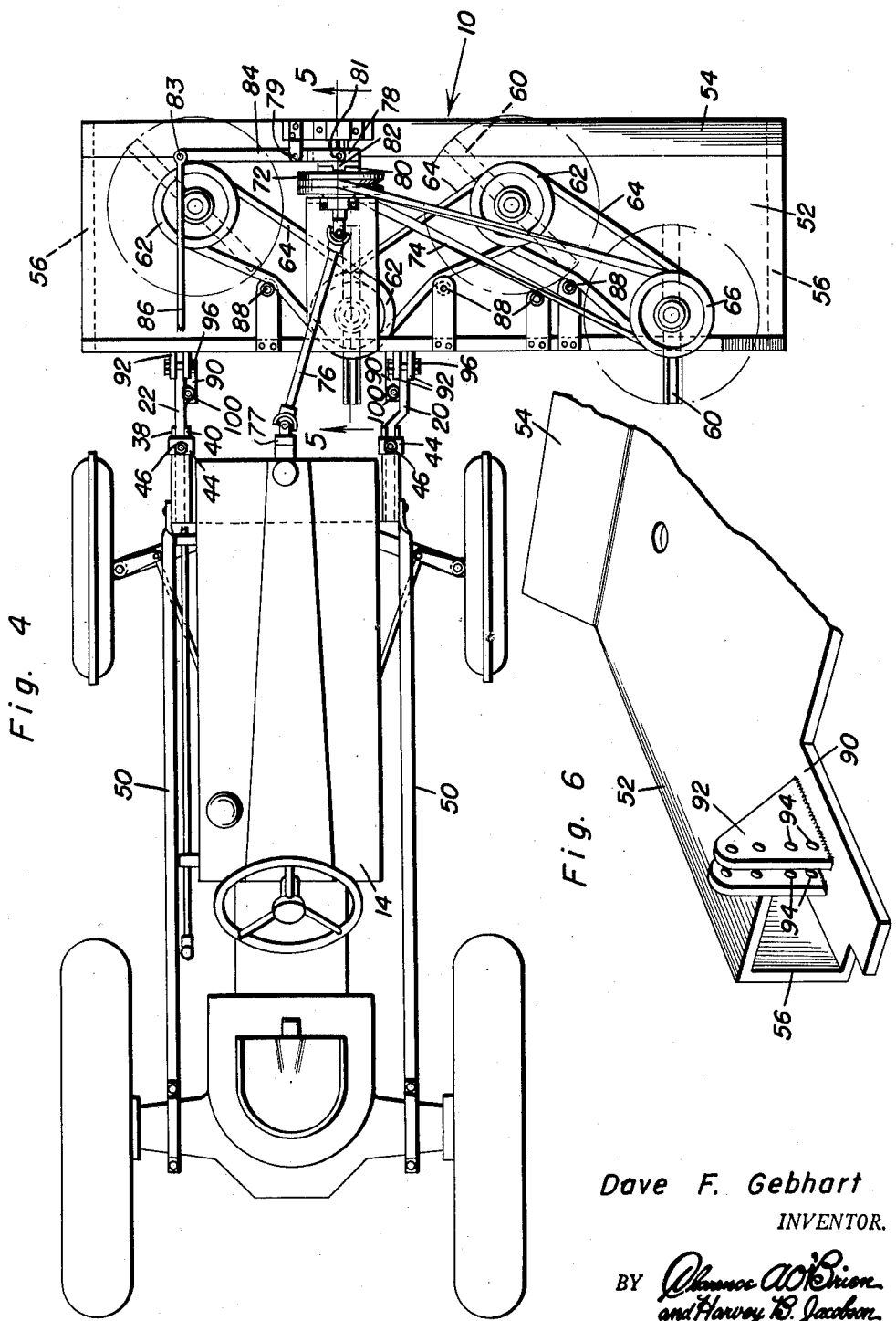
Figure 4 is a top plan view showing the cutting member mounted on the front end of a tractor.
Figure 6 is an enlarged perspective view of one end of the horizontal plate which supports the cutting members.

Referring now more particularly to the accompanying drawings, it will be seen that the improved cutter attachment for tractors forming the subject of this invention includes, as shown in Figure 3, a cutter attachment 10 having means 12 securing the same to a tractor 14. The tractor 14 can be of any conventional make.

Figure 1:
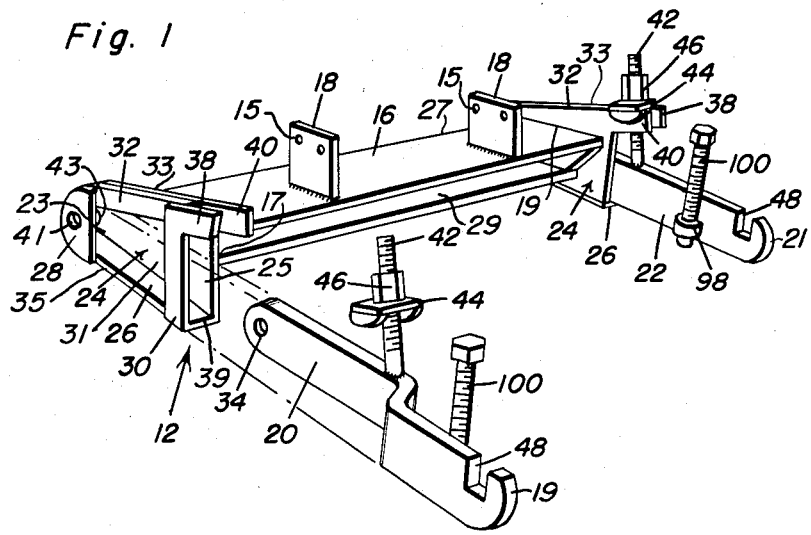
Figure 1 is a perspective view showing the novel support for attaching the cutting member to a tractor.
Figure 2:
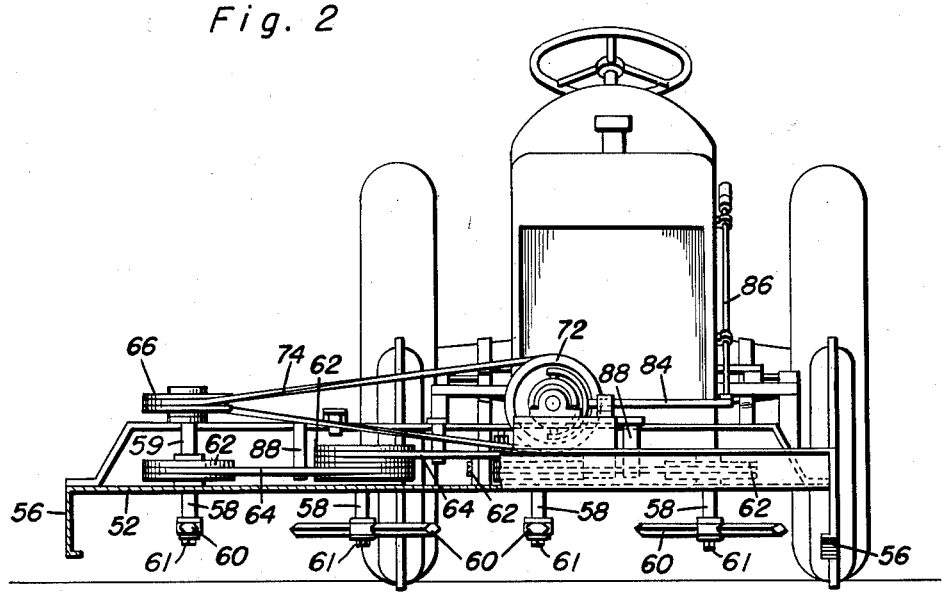
Figure 2 is a front end elevational view with parts broken away, showing the cutting attachment mounted for operation on a tractor.

As seen in Figure 1, the attaching means 12 comprises a longitudinal member 16 having a pair of ears 18 extending upwardly therefrom. The ears 18 are adapted to be secured to the front end of the tractor 14 by bolting thereto, as at 13, through bolt holes 15 in said ears. Each end 17, 19 of the member 16 is provided with a guide means for supporting forwardly extending arms 20 and 22. The guide means is formed of a substantially V-shaped plate 24 which is provided with a narrow rear end 23 and a wide front end 25. The narrow end is disposed in the rear 27 of the member 16 and the wide end is disposed at the front 29 of the member 16. The plate 24 is vertically disposed with a lower side edge 31 disposed below and parallel to the horizontal surface of the member 16. The other upper side edge 33 of the plate 24 is disposed above and diverges upwardly from the member 16. A lateral flange 26 extends from the lower edge 35 of the plate 24 in a direction away from the member 16. A pair of legs 28 and 30 are secured to the outer edge 35 of the flange 26 and extend upwardly therefrom parallel to the plate 24. The leg 28 is disposed opposite the rear end 23 of the plate 24. The leg 30 is disposed opposite the front end 25 of the plate 24. The legs 28 and 30 extend upwardly the same distance above the plate 24. A flange 32 is secured between the upper edge 33 of the plate 24 and the legs 28 and 30 and extends along and parallel with said edge 33. The leg 28 and the rear end 23 of the plate 24 are provided with axially aligned apertures 41, 43. The arms 20 and 22 are inserted into the guide means from the front and are provided with apertures 34 which are adapted to be aligned with the apertures 41, 43 in the legs 28 and the plates 24. A pin 36 extends through the apertures 41, 43 in the legs 28 and the plate 24 and the apertures 34 for pivotally mounting the arms 20 and 22 in the guides.

The upper edges 33 of the plates 24 are provided with formwardly extending projections 40 and the legs 30 are provided with upper forwardly extending projections 38 laterally offset and spaced from the projections 40. The arms 20 and 22 are provided with threaded bolts 42 extending upwardly and rearwardly therefrom adjacent the midportion. The bolts 42 are adapted to be received between the projections 38 and 40. A U-shaped member 44 is threaded on each bolt 42 to straddle and seat on the projections 38, 40 between which the bolt 42 is received. The member 44 is adapted to engage the upper edges of the projections 38 and 40 for adjusting the position of the arms 20 and 22. A nut 46 is mounted on the bolt 42 above the member 44. The nut 46 will retain the member 44 in fixed position on the bolt 42.

The forward ends 19, 21 of the forwardly extending arms 20 and 22 are each provided with a notch 48 in the upper surface thereof. The purpose of the notches 48 will be later described.

A suitable brace member 50 is secured to the pin 36 and extends rearwardly of the tractor where it is secured to the rear axle. The brace 50 provides a means for more rigidly securing the attaching assembly 12 to the tractor. As will be seen, the plates 24, flanges 26, 32 and legs 28, 30 form a pair of substantially horizontal guides on the ends 17, 19 of the plate 16 which flare forwardly vertically and in which the arms 20, 22 are pivotally adjustable and confined against lateral play.

The cutter attachment 10 is formed of a horizontally disposed plate 52 having an upwardly turned front edge portion 54. The plate 52 is provided with downwardly extending flanges 56 at each end thereof which flanges serve to limit the downward movement of the plate 52. A plurality of vertically disposed shafts 58 are journaled through the plate 52 for rotation therein. A cutter blade 60 is secured to the lower end 61 of each of the shafts 58 below the plate 52. The cutter blades 60 are laterally disposed and are longitudinally offset whereby the cutting blades will substantially overlap each other whereby a full clear path may be cut by this attachment. The shafts 58 are each provided with a pulley member 62 above the plate 52. On some of the shafts 58 the pulley members 62 will have more than one belt entrained thereon.

The pulleys 62 on the shafts 58 are interconnected by means of endless belts 64. The pulleys 62 are interconnected in such a manner that rotation of one of the pulleys will cause rotation of all of the pulleys.

Means are provided for imparting rotation to one of the pulleys. This means comprises an upper end extension 59 on one of the shafts 58. A pulley 66 is secured to the extension 59 above the pulley member 62 on said shaft. A shaft 68 is mounted in a horizontal position above the plate 52. The shaft 68 is mounted for rotation in bearings 70. A pulley 72 is freely mounted on the shaft 68 and is operatively connected to the pulley 66 by means of an endless belt 74. Thus, when rotation is imparted to the pulley 72 the cutter blade 60 will be rotated by means of the connections to the pulley 72. A shaft 76 is terminally connected by universal joints, 67, 69 to the shaft 68 and to the power take-off 77 of the tractor. A clutch disc 78 is slidably mounted on the shaft 68 for rotation therewith. The clutch disc 78 is movable into engagement with the pulley 72 for connecting the same to the shaft 68.

The engagement of the clutch disc 78 with the pulley 72 is by means of a plurality of notches 80 in one face of the pulley 72 which receives a plurality of projections 82 on the face of the clutch disc 78 adjacent the pulley 72. Means are provided for actuating the clutch disc 78 which means comprises a link 84 pivotally mounted at 79 on the plate 52 and pivotally connected at 81 to the clutch disc 78. A link 86 is pivotally connected as at 83 to the link 84 which link 86 extends rearwardly of the tractor to a position adjacent the driver's seat.

The plate 52 is provided with a plurality of vertically disposed rollers 88 which bear against the belts 64 and 74 for maintaining tension thereagainst.

The plate 52 is provided with a pair of rearwardly extending projections 90. Each of the projections 90 has mounted thereon a pair of spaced ears 92. The spaced ears 92 extend upwardly from the projections 90. A plurality of apertures 94 are provided in each of the ears 92. The apertures 94 of one ear are axially aligned with the apertures 94 in the other ear. The forward ends 19, 21 of the arms 20 and 22 are adapted to be positioned between the ears 92. A bolt 96 is adapted to be inserted through the aligned apertures 94 of the ears 92 and to be engaged in the notches 48 at the forward ends of the arms 20 and 22. The projections 90 extend rearwardly of the ears 92 and underlie the arms 20 and 22.

The arms 20 and 22 are each provided with an apertured ear 98 extending from one side thereof. A vertical bolt 100 is threaded through each of the ears 98 and engages the rear end 101 of the projections 90 when the cutter attachment 10 is connected to the attaching assembly 12.

In practical use, the member 16 is first attached to the front end of the tractor 14 by means of the members 18 and bolts 13. Then the arms 20 and 22 are secured in position in the guides on the ends of member 16. The cutter attachment is then secured to the ends of the arms 20 and 22 with the shaft 76 being connected to the power take-off of the tractor. The cutter attachment can be adjusted vertically in either of two ways. The nut 46 can be loosened or tightened to vary the height of the cutter or the bolts 100 can be tightened in the ears 98 to press against the projections 90 to vary the height of the cutter attachment. When it is desired to start the cutter blades in operation, the clutch disc 78 is actuated to engage the pulley 72. The rotation of the pulley 72 will be transmitted through the belt 74, pulley 66, pulley 62 and belt 64 to the shafts 58. There is thus provided a method whereby the cutter blades can be rendered inoperative without using the power take-off controls.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A support for mounting implements on tractors comprising a longitudinal member having ends and adapted to be secured to the front end of a tractor in transverse relationship thereto, a pair of horizontal guides on the ends of said member having a forward end and a rear end and a closed side secured to the end of said member, said guides flaring forwardly vertically, a forwardly extending arm pivotally secured in each guide to the rear end of each of said guides, and adjusting means connected between each of the forwardly extending arms and the front ends of the guides for adjusting the angular position of the arms with respect to said guides.

2. The combination of claim 1 wherein said closed side comprises a V-shaped plate having a narrow end and a wide end, said plate being secured to said member in vertical relationship thereto with the narrow end at the rear and the wide end at the front, said plate having one side edge thereof disposed below and parallel to said member, the other side edge thereof being disposed above and diverging upwardly from said member, a flange secured to the lower edge of said plate and extending away from said member, a pair of legs extending upwardly from said flange, one of said legs being aligned with the front of said plate and the other of said legs being aligned with the rear of said plate and a flange extending between the upper edge of said plate and the upper ends of said legs, said forwardly extending arms being positioned between said plate and said legs and pivotally secured to the rear leg and the rear end of said plate.

3. The combination of claim 2 wherein said adjusting means comprises a projection secured to the front end of said plate and extending forwardly therefrom adjacent the top thereof, a forwardly extending projection on the front leg, said last named projection being aligned with the first named projection, a threaded bolt secured to said forwardly extending arms and extending upwardly therefrom, said bolt being received between the projections, and a nut mounted on the upper end of said bolt, said nut being disposed above said projections and engaging the upper edges thereof.

4. The combination of claim 3 wherein said forwardly extending arms are provided with means for connecting an implement thereto, said means comprising a notch in the upper edge thereof adjacent the forward end of the arms.

5. A cutter attachment for tractors comrising a horizontally disposed plate having a plurality of vertical shafts mounted for rotation thereon, said shafts extending above and below said plate, a cutter blade secured on the lower end of each of said shafts, drive means mounted above said plate, said drive means being operatively connected to said shafts, and said drive means being adapted to be connected to a power take-off on a tractor, a longitudinal plate adapted to be secured to the front end of a tractor in transverse relationship thereto, vertically flaring guides closed at one side and secured to each end of said plate, a forwardly extending arm having a rear end pivotally secured in each guide for vertical adjustment therein, said forwardly extending arms being secured at the forward ends thereof to the rear of said first mentioned plate.

References Cited in the file of this patent

UNITED STATES PATENTS

| | | |
|---|---|---|
| 2,413,873 | Hume | Jan. 7, 1947 |
| 2,483,683 | Wells et al. | Oct. 4, 1949 |
| 2,558,123 | Brown et al. | June 26, 1951 |
| 2,585,405 | Reiter | Feb. 12, 1952 |
| 2,596,641 | Bert et al. | May 12, 1952 |
| 2,612,385 | Piltz | Sept. 30, 1952 |
| 2,634,571 | Lawrence et al. | Apr. 14, 1953 |
| 2,681,536 | Kuhary et al. | June 22, 1954 |
| 2,685,160 | Kuhary et al. | Aug. 3, 1954 |